United States Patent
Imahori et al.

(10) Patent No.: US 9,567,413 B2
(45) Date of Patent: Feb. 14, 2017

(54) METHOD FOR PRODUCING FLUORINE-CONTAINING POLYMER

(75) Inventors: Yuji Imahori, Settsu (JP); Mayumi Iida, Settsu (JP); Katsuhiko Imoto, Settsu (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 25 days.

(21) Appl. No.: 13/876,986

(22) PCT Filed: Sep. 30, 2011

(86) PCT No.: PCT/JP2011/072663
§ 371 (c)(1),
(2), (4) Date: Mar. 29, 2013

(87) PCT Pub. No.: WO2012/043831
PCT Pub. Date: Apr. 5, 2012

(65) Prior Publication Data
US 2013/0203950 A1    Aug. 8, 2013

(30) Foreign Application Priority Data
Sep. 30, 2010 (JP) .................................. 2010-222571

(51) Int. Cl.
C08F 14/26 (2006.01)
C08F 214/26 (2006.01)
C08F 214/18 (2006.01)
C08F 2/26 (2006.01)

(52) U.S. Cl.
CPC ............. *C08F 14/26* (2013.01); *C08F 2/26* (2013.01); *C08F 214/18* (2013.01); *C08F 214/186* (2013.01); *C08F 214/188* (2013.01); *C08F 214/26* (2013.01); *C08F 214/267* (2013.01)

(58) Field of Classification Search
CPC ...................................................... C08F 14/18
USPC ........................................................ 526/222
See application file for complete search history.

(56) References Cited

U.S. PATENT DOCUMENTS

| | | | |
|---|---|---|---|
| 5,179,158 A | 1/1993 | Azuma et al. | |
| 5,229,461 A * | 7/1993 | Saitoh ................. | C09D 127/18 525/199 |
| 5,415,958 A * | 5/1995 | Takahashi ........... | C08F 214/225 429/217 |
| 6,512,063 B2 | 1/2003 | Tang | |
| 8,252,398 B2 * | 8/2012 | Sakabe ................. | B32B 1/08 428/36.9 |
| 2006/0223924 A1 | 10/2006 | Tsuda et al. | |
| 2007/0018783 A1 | 1/2007 | Erhardt | |
| 2007/0032591 A1 | 2/2007 | Durali et al. | |
| 2007/0149733 A1 | 6/2007 | Otsuka et al. | |
| 2009/0186986 A1 * | 7/2009 | Nomura et al. ........... | 525/326.3 |
| 2009/0234086 A1 | 9/2009 | Kishine et al. | |
| 2010/0029878 A1 | 2/2010 | Matsuoka et al. | |
| 2010/0081765 A1 * | 4/2010 | Minge ....................... | C08F 2/16 524/806 |
| 2010/0222494 A1 * | 9/2010 | Imoto et al. .................. | 524/546 |

FOREIGN PATENT DOCUMENTS

| | | | | |
|---|---|---|---|---|
| CN | 1823094 A | 8/2006 | | |
| CN | 101484476 A | 7/2009 | | |
| FR | 1410004 A | 9/1965 | | |
| GB | 1069364 A | 5/1967 | | |
| GB | 1087999 A | * 10/1967 | ............. | B32B 15/08 |
| GB | 1509404 A | 5/1978 | | |
| JP | 3-163103 A | 7/1991 | | |
| JP | 2003-119204 A | 4/2003 | | |
| JP | 2005-48178 A | 2/2005 | | |
| JP | 2007332216 A | * 12/2007 | | |
| JP | WO 2009084483 A1 | * 7/2009 | ............... | B32B 1/08 |
| WO | 2005/063827 A1 | 7/2005 | | |
| WO | 2008/001895 A1 | 1/2008 | | |
| WO | 2008/132959 A1 | 11/2008 | | |

OTHER PUBLICATIONS

Machine translation of JP 2007-332216 A, ProQuest Dialog, Oct. 2014.*
International Search Report for PCT/JP2011/072663 dated Nov. 8, 2011.
International Preliminary Report on Patentability, together with the Written Opinion of the International Searching Authority, issued Apr. 9, 2013 for corresponding PCT/JP2011/072663.
Communication dated Dec. 1, 2015 from the European Patent Office in counterpart European Application No. 11829384.4.

* cited by examiner

*Primary Examiner* — Nicole M Buie-Hatcher
(74) *Attorney, Agent, or Firm* — Sughrue Mion, PLLC

(57) ABSTRACT

Provided is a method for producing a fluoropolymer in the presence of a specific non-fluorinated compound having surface activity. The method shows a high polymerization rate, and suppresses formation of sticking polymerization materials after production of a polymer product. The method includes aqueous dispersion polymerization of a fluoroolefin in the presence of a compound (1) represented by formula (1):

$$R^1OCOCHSO_3M$$
$$|$$
$$R^2OCOCH_2$$
(1)

wherein $R^1$ and $R^2$ are the same as or different from each other, and each represent a C4 to C12 non-fluorinated saturated hydrocarbon group; and M is an alkali metal, an ammonium salt, or an amine salt.

6 Claims, No Drawings

METHOD FOR PRODUCING FLUORINE-CONTAINING POLYMER

CROSS REFERENCE TO RELATED APPLICATIONS

This application is a National Stage of International Application No. PCT/JP2011/072663 filed Sep. 30, 2011, claiming priority based on Japanese Patent Application No. 2010-222571 filed Sep. 30, 2010, the contents of all of which are incorporated herein by reference in their entirety.

TECHNICAL FIELD

The present invention relates to a method for producing a fluoropolymer in the presence of a non-fluorinated compound that has surface activity.

BACKGROUND ART

Fluoropolymers have excellent properties of chemical resistance, solvent resistance, heat resistance, and fouling resistance, and are therefore used as materials of various products effectively utilizing the properties, in a wide range of industrial fields such as the automobile industry, semiconductor industry, chemical industry, and coating materials.

These fluoropolymers are produced by emulsion polymerization, suspension polymerization, or solution polymerization of fluoroolefins. The emulsion polymerization usually utilizes surfactants. An increased amount of surfactant leads to a greater number of polymer particles generated in the initial stage of the emulsion polymerization, which increases the polymerization rate and improves the production efficiency of fluoropolymers. In the case of using a large amount of surfactant, however, the obtained fluoropolymer tends to show deteriorated properties (e.g. water resistance). For this reason, a production method has been desired which enables efficient polymerization in the presence of a small amount of surfactant and which does not adversely affect the properties of the fluoropolymer.

Based on such a state of the art, Patent Literature 1 proposes a method of producing a fluoropolymer in the presence of a linear aliphatic sulfonate surfactant in place of expensive ammonium perfluorooctanoate that is commonly used in emulsion polymerization of a fluoropolymer. This method actually has a problem that the number of particles of the fluoropolymer generated is small.

Patent Literatures 2 and 3 propose a production method utilizing an alkyl phosphoric acid or an ester thereof as a non-fluorinated surfactant. Patent Literature 4 proposes a method utilizing a compound in which phosphoric acid, sulfonic acid, carboxylic acid, or the like acid is bonded to quaternary carbon atoms.

CITATION LIST

Patent Literature
  Patent Literature 1: U.S. Pat. No. 6,512,063
  Patent Literature 2: U.S. 2007/0032591 A1
  Patent Literature 3: U.S. 2007/0018783 A1
  Patent Literature 4: WO 2005/063827 A1

SUMMARY OF INVENTION

Technical Problem

In this way, conventional aqueous dispersion polymerization of monomers including fluoroolefins is performed in the presence of a surfactant containing a linear alkyl or alkoxy alkyl group. Such a surfactant, however, is likely to leave polymerization materials sticking on the polymerization vessel wall after production of the polymer product and decrease the polymerization rate, compared to ammonium perfluorooctanoate.

The present invention aims to provide a method for producing a fluoropolymer in the presence of a specific non-fluorinated compound displaying surface activity, the method showing a high polymerization rate and suppressing formation of sticking polymerization materials after production of a polymer product.

Solution to Problem

That is, the present invention relates to a method for producing a fluoropolymer, comprising aqueous dispersion polymerization of a fluoroolefin in the presence of a compound (1) represented by formula (1):

[Chem. 1]

(1)

wherein $R^1$ and $R^2$ are the same as or different from each other, and each represent a C4 to C12 non-fluorinated saturated hydrocarbon group; and M is an alkali metal, an ammonium salt, or an amine salt.

In the above formula (1), it is preferable that $R^1$ and $R^2$ are the same as each other, and represent a C4 to C12 non-fluorinated alkyl group.

The compound (1) is preferably sodium dioctyl sulfosuccinate or sodium didecyl sulfosuccinate.

In the method for producing a fluoropolymer according to the present invention, it is preferable that the aqueous dispersion polymerization of a fluoroolefin is carried out together with a non-fluorinated vinyl monomer and a non-fluorinated monomer having a crosslinkable group.

The fluoroolefin is preferably at least one selected from the group consisting of vinyl fluoride, vinylidene fluoride, tetrafluoroethylene, hexafluoropropylene, chlorotrifluoroethylene, and 2,3,3,3-tetrafluoropropene. The fluoroolefin is preferably at least one selected from the group consisting of tetrafluoroethylene, hexafluoropropylene, chlorotrifluoroethylene, and 2,3,3,3-tetrafluoropropene.

The non-fluorinated vinyl monomer is preferably at least one selected from the group consisting of olefins, vinyl ethers, and vinyl esters.

The non-fluorinated monomer having a crosslinkable group is preferably a hydroxy group-containing vinyl monomer or an unsaturated carboxylic acid.

The aqueous dispersion polymerization in production method of the present invention is preferably emulsion polymerization.

Advantageous Effects of Invention

The present invention can provide a method for producing a fluoropolymer, which shows a high polymerization rate and suppressing formation of sticking polymerization materials after production of a polymer product.

DESCRIPTION OF EMBODIMENTS

The method for producing a fluoropolymer according to the present invention relates to a method for producing a fluoropolymer, comprising aqueous dispersion polymerization of a fluoroolefin in the presence of a compound (1) represented by formula (1):

[Chem. 2]

wherein $R^1$ and $R^2$ are the same as or different from each other, and each represent a C4 to C12 non-fluorinated saturated hydrocarbon group; and M is an alkali metal, an ammonium salt, or an amine salt.

That is, the present invention directs to a method for producing a fluoropolymer, which polymerizes a fluoroolefin in the presence of a specific compound in water.

The fluoroolefin to be polymerized by the production method of the present invention is not particularly limited, and one species or two or more species of fluoroolefins can be used. Examples of fluoroolefins include perfluoroolefins such as tetrafluoroethylene (TFE), hexafluoropropylene (HFP), perfluoro(alkyl vinyl ether) (PAVE), and

[Chem. 3]

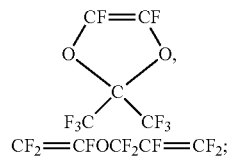

and non-perfluoroolefins such as chlorotrifluoroethylene (CTFE), vinyl fluoride (VF), vinylidene fluoride (VdF), trifluoroethylene, trifluoropropylene, pentafluoropropylene, tetrafluoropropylene, and hexafluoroisobutene. Examples of the PAVE include perfluoro(methyl vinyl ether) (PMVE), perfluoro(ethyl vinyl ether) (PEVE), perfluoro(propylvinyl ether) (PPVE), and 2,3,3,3-tetrafluoropropene.

Among these fluoroolefins, at least one fluoroolefin selected from the group consisting of vinyl fluoride, vinylidene fluoride, tetrafluoroethylene, hexafluoropropylene, chlorotrifluoroethylene, and 2,3,3,3-tetrafluoropropene is preferred because they are inexpensive and have favorable copolymerizability. Particularly, at least one selected from the group consisting of tetrafluoroethylene, hexafluoropropylene, chlorotrifluoroethylene, and 2,3,3,3-tetrafluoropropene is preferred because they have excellent fouling resistance and weather resistance.

In the production method of the present invention, a fluoroolefin and a non-fluorinated monomer copolymerizable with a fluoroolefin may be copolymerized. Examples of the non-fluorinated monomer copolymerizable with a fluoroolefin include non-fluorinated vinyl monomers and non-fluorinated monomers having a crosslinkable group.

Preferred examples of non-fluorinated vinyl monomers include olefins such as ethylene, propylene, isobutylene, and n-butene; vinyl ethers such as ethyl vinyl ether, cyclohexyl vinyl ether, and methyl vinyl ether; and vinyl esters such as vinyl acetate, vinyl versatate (Veova 9 and Veova 10, products of Shell), vinyl benzoate, vinyl pivalate, vinyl laurate, vinyl stearate, and vinyl cyclohexylcarboxylate. Particularly, vinyl acetate, ethyl vinyl ether, and cyclohexyl vinyl ether are preferred in terms of improving the compatibility with a curing agent, coating film hardness, coating film transparency, and film formability.

Examples of non-fluorinated monomers having a crosslinkable group include unsaturated carboxylic acids such as undecylenic acid, crotonic acid, maleic acid, maleic acid monoesters, vinylacetic acid, cinnamic acid, 3-allyloxy propionic acid, itaconic acid, and itaconic acid monoesters; and hydroxy group-containing vinyl monomers such as 2-hydroxyethyl vinyl ether, 3-hydroxypropyl vinyl ether, 2-hydroxypropyl vinyl ether, 2-hydroxy-2-methylpropyl vinyl ether, 4-hydroxybutyl vinyl ether, 4-hydroxy-2-methylbutyl vinyl ether, 5-hydroxypentyl vinyl ether, 6-hydroxyhexyl vinyl ether, 2-hydroxyethyl allyl ether, 4-hydroxybutyl allyl ether, and glycerol monoallyl ether. Among these, 2-hydroxyethyl vinyl ether, 4-hydroxybutyl vinyl ether, and undecylenic acid are preferred because they have excellent polymerization reactivity and curability.

The non-fluorinated monomer copolymerizable with a fluoroolefin may include a macromonomer. The macromonomer preferably has a hydrophilic moiety. Particularly, a macromonomer having a vinyl ether group at one terminal is preferred for its excellent copolymerizability with a fluoroolefin. The macromonomer may have a crosslinkable functional group, such as a hydroxy group and a carboxyl group, at a terminal.

In the case of copolymerizing a fluoroolefin and a non-fluorinated monomer copolymerizable therewith, the resulting fluorocopolymer has a composition ratio (% by mass) of fluoroolefin/non-fluorinated vinyl monomer/non-fluorinated monomer having a crosslinkable group of 30 to 60/10 to 69/1 to 30, and more preferably 40 to 50/25 to 57/3 to 25.

The present invention employs aqueous dispersion polymerization of a fluoroolefin in the presence of the compound (1) (surfactant). The aqueous dispersion polymerization can be exemplified by emulsion polymerization or suspension polymerization; particularly in terms of producing a large number of polymer particles having a small particle size, emulsion polymerization is suitable.

The compound (1) is a compound represented by formula (1):

[Chem. 4]

wherein $R^1$ and $R^2$ are the same as or different from each other, and each represent a C4 to C12 non-fluorinated saturated hydrocarbon group; and M is an alkali metal, an ammonium salt, or an amine salt.

The alkali metal salt of dialkyl sulfosuccinic acid included in the compound represented by the above formula (1) is known as an emulsifier for emulsion polymerization; however, no cases are found where such an alkali metal salt is applied to polymerization of a fluoroolefin.

WO 2002/010237 A1 discloses addition of an alkali metal salt of dialkyl sulfosuccinic acid to an aqueous dispersion of a fluororesin obtained by emulsion polymerization of monomers including a fluoroolefin in the presence of a nonionic emulsifier in combination with an anionic emulsifier, for improvement of mechanical stability and thermal stability.

The alkali metal salt of dialkyl sulfosuccinic acid, however, is not used as an emulsifier for polymerization of the fluoroolefin.

In the above formula (1), $R^1$ and $R^2$ are the same as or different from each other, and each represent a C4 to C12 non-fluorinated saturated hydrocarbon group. Accordingly, the compound (1) does not encompass what is called a reactive emulsifier that contains an unsaturated group. The compound (1) does not encompass a known surfactant containing a linear hydrocarbon group (e.g. sodium dodecyl sulfate, sodium cetyl sulfate) either.

$R^1$ and $R^2$ each preferably are a C4 to C12 non-fluorinated alkyl group.

The carbon number of $R^1$ and $R^2$ is preferably 6 to 10, and more preferably 8 to 10, for favorable surface tension decreasing ability and favorable polymerization rate. Also, $R^1$ and $R^2$ are preferably the same as each other for easy synthesis.

M is an alkali metal, ammonium salt, or amine salt, and can be exemplified by sodium, an ammonium salt, and a triethylamine salt. Particularly, sodium and an ammonium salt are preferred.

More specifically, M is preferably sodium, potassium, $NH_4$, $R—NH_3$, $R_2—NH_2$, or $R_3—NH$ (R is a non-fluorinated hydrocarbon group), and more preferably sodium or $NH_4$.

Specific examples of the compound (1) include sodium dioctyl sulfosuccinate, sodium didecyl sulfosuccinate, sodium dihexyl sulfosuccinate, sodium diisobutyl sulfosuccinate, sodium diamyl sulfosuccinate, and ammonium dioctyl sulfosuccinate. For easy availability and favorable polymerization rate, sodium dioctyl sulfosuccinate and sodium didecyl sulfosuccinate are preferred.

The amount of the compound (1), for example in the case of emulsion polymerization, is preferably 10 to 100000 ppm, more preferably 500 to 50000 ppm, still more preferably 2000 to 40000 ppm, and particularly preferably 4000 to 30000 ppm, based on the total amount of water. An amount of the compound (1) of less than 10 ppm tends to decrease the surface activity to generate a smaller number of particles.

The compound (1) contributes to sufficiently stable emulsion polymerization even when used alone, but the compound (1) may be used together with other surfactant(s).

The other surfactant(s) may be non-fluorinated (hydrocarbon) surfactant(s) (other than the compound of formula (1)).

The total amount of the compound (1) and the other surfactant(s) usable in combination, for example in the case of emulsion polymerization, is preferably 10 to 100000 ppm, and more preferably 2000 to 50000 ppm, based on the total amount of water. A total amount of the compound (1) and the other surfactant(s) of less than 10 ppm tends to decrease the surface activity to generate a smaller number of the fluoropolymer particles.

The polymerization temperature is not particularly limited, and a temperature suitable to the polymerization initiator used may be employed. Still, too high a polymerization temperature may easily decrease the monomer density in the gaseous phase or cause chain branching reaction of the polymers, failing to give the desired copolymer. The polymerization temperature is preferably 40° C. to 120° C., and more preferably 50° C. to 100° C.

The monomers may be supplied continuously or sequentially.

The polymerization initiator can be an oil-soluble peroxide, but peroxy carbonates (e.g. diisopropyl peroxy dicarbonate (IPP), di-n-propyl peroxy dicarbonate (NPP)), which are typical oil-soluble initiators, have problems such as a risk of explosion or the like, expensiveness, and a tendency for scale to be formed on the polymerization vessel wall during polymerization reaction. In order to further reduce the compression set of the fluoropolymer, a water-soluble radical polymerization initiator is preferably used. Preferable examples of the water-soluble radical polymerization initiator include ammonium salts, potassium salts, and sodium salts of persulfuric acid, perboric acid, perchloric acid, perphosphoric acid, or percarbonic acid. Particularly, ammonium persulfate and potassium persulfate are preferred.

The amount of the polymerization initiator is not particularly limited as long as it is an amount that is not likely to significantly decrease the polymerization rate (e.g. several ppm based on water concentration) or more. The polymerization initiator should be added collectively at the beginning of the polymerization, or may be added sequentially or continuously. The upper limit of the amount thereof is an amount that the heat generated by the polymerization reaction can be removed from the device surface.

The production method of the present invention may also use a molecular weight regulator. The molecular weight regulator may be added collectively at the beginning, or may be added continuously or in portions.

Examples of the molecular weight regulator include esters (dimethyl malonate, diethyl malonate, methyl acetate, ethyl acetate, butyl acetate, and dimethyl succinate), isopentane, isopropanol, acetone, various mercaptans, carbon tetrachloride, cyclohexane, monoiodomethane, 1-iodomethane, 1-iodopropane, isopropyl iodide, diiodomethane, 1,2-diiodomethane, and 1,3-diiodopropane.

Other additives such as a buffer may also be appropriately used, preferably to an extent that does not deteriorate the effects of the present invention.

The polymerization pressure may be appropriately selected in the range of 0.1 to 10 MPa, and more preferably in the range of 0.2 to 8 MPa. The polymerization pressure may be low (0.1 to 1 MPa) or high (1 to 10 MPa) as long as it is in the above range.

For stirring, blades such as anchor blades, turbine blades, and inclination blades can be used, for example. In order to achieve favorable diffusion of monomers and dispersion stability of the polymer, stirring with large blades, which are called full zones or max blends, is preferred. The stirring device may be a horizontal stirring device or vertical stirring device.

In this way, the present invention utilizes a specific compound as a surfactant in emulsion polymerization of a fluoroolefin to produce a fluoropolymer dispersion. It is therefore possible to prevent polymerization materials sticking on the polymerization vessel wall after production of the polymer product. Also, the polymerization rate is increased, and thus a fluoropolymer dispersion can be produced in a short time.

The production method of the present invention, utilizing a specific non-fluorinated compound displaying surface activity, can increase the polymerization rate and suppress formation of sticking polymerization materials.

EXAMPLES

Hereinafter, the present invention will be described in more detail based on the examples which, however, are not intended to limit the scope of the present invention.

Example 1

A 0.5-L stainless steel autoclave was charged with pure water (250 g), sodium carbonate (0.55 g), NEOCOL P (a 75.3% by mass solution of sodium dioctyl sulfosuccinate represented by

[Chem. 5]

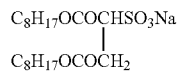

in isopropyl alcohol; product of Daiichi Kogyo Seiyaku Co., Ltd., 2.05 g, 6000 ppm based on polywater), cyclohexyl vinyl ether (CHVE) (40.0 g), and undecylenic acid (UDA) (2.5 g). The air in the autoclave was replaced with nitrogen gas. The autoclave was further charged with tetrafluoroethylene (TFE) (9 g), and then the temperature in the vessel was increased to 60° C. At this time, the pressure in the vessel was 0.75 MPa. To the vessel was added 5.0 g of a 10% by mass aqueous solution of ammonium persulfate (APS) with stirring so that the reaction was started. During the reaction, TFE was continuously supplied using an electromagnetic valve. The stirring speed at the time of starting the reaction was 260 rpm.

The supply of TFE and the pressure were controlled using an electromagnetic valve which was set to operate in a cycle of automatically opening to supply TFE when TFE was consumed and the pressure in the vessel reached 0.725 MPa, and automatically closing when the pressure in the vessel reached 0.75 MPa. The time from opening of the electromagnetic valve to the next opening is regarded as one cycle.

The stirring speed was increased to 600 rpm after 2 hours from the start of the reaction. Since the time for one cycle was lengthened to 20 minutes, the supply of TFE was stopped to end the reaction after 7 hours from the start of the reaction. Thereafter, the temperature and pressure in the vessel were brought back to the normal temperature and pressure to terminate the polymerization, whereby 316.5 g (solids concentration: 19.5% by mass) of a TFE/CHVE/UDA copolymer emulsion was obtained. The polymerization rate was 18.4 g/h/L. Neither scale nor sedimentation was formed after production of the polymer emulsion.

Polymerization rate: the amount of the polymer generated in a 1-L polymerization vessel per hour, expressed in a unit of g/h/L.

Example 2

A 0.5-L stainless steel autoclave was charged with pure water (250 g), sodium carbonate (0.55 g), NEOCOL P (sodium dioctyl sulfosuccinate, 9.96 g, 30000 ppm based on polywater), CHVE (40.0 g), and UDA (2.5 g). The air in the autoclave was replaced with nitrogen gas. The autoclave was further charged with TFE (9 g), and then the temperature in the vessel was increased to 60° C. At this time, the pressure in the vessel was 0.75 MPa. To the vessel was added 5.0 g of a 10% by mass aqueous solution of APS with stirring so that the reaction was started. During the reaction, TFE was continuously supplied using an electromagnetic valve. The stirring speed at the time of starting the reaction was 260 rpm. The pressure during the polymerization was automatically adjusted in the range of 0.750 to 0.725 MPa with use of an electromagnetic valve in the same manner as in Example 1.

The stirring speed was increased to 600 rpm after 1.5 hours from the start of the reaction. Since the time for one cycle was lengthened to 14 minutes, the supply of TFE was stopped to end the reaction after 6.75 hours from the start of the reaction. Thereafter, the temperature and pressure in the vessel were brought back to the normal temperature and pressure to terminate the polymerization, whereby 332.2 g (solids concentration: 19.8% by mass) of a TFE/CHVE/UDA copolymer emulsion was obtained. The polymerization rate was 20.2 g/h/L. Neither scale nor sedimentation was formed after production of the polymer emulsion.

Example 3

A 0.5-L stainless steel autoclave was charged with pure water (250 g), sodium carbonate (0.55 g), a 60.1% by mass solution of sodium didecyl sulfosuccinate represented by

[Chem. 6]

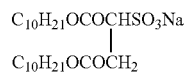

in isopropyl alcohol (2.57 g, 6000 ppm based on polywater), CHVE (40.0 g), and UDA (2.5 g). The air in the autoclave was replaced with nitrogen gas. The autoclave was further charged with TFE (9 g), and then the temperature in the vessel was increased to 60° C. At this time, the pressure in the vessel was 0.75 MPa. To the vessel was added 5.0 g of a 10% by mass aqueous solution of APS with stirring so that the reaction was started. During the reaction, TFE was continuously supplied using an electromagnetic valve. The stirring speed at the time of starting the reaction was 260 rpm. The pressure during the polymerization was automatically adjusted in the range of 0.750 to 0.725 MPa with use of an electromagnetic valve in the same manner as in Example 1.

The stirring speed was increased to 600 rpm after 1.0 hour from the start of the reaction. Since the time for one cycle was lengthened to 7 minutes, the supply of TFE was stopped to end the reaction after 7.3 hours from the start of the reaction. Thereafter, the temperature and pressure in the vessel were brought back to the normal temperature and pressure to terminate the polymerization, whereby 318.5 g (solids concentration: 17.2% by mass) of a TFE/CHVE/UDA copolymer emulsion was obtained. The polymerization rate was 14.6 g/h/L. Neither scale nor sedimentation was formed after production of the polymer emulsion.

Example 4

A 3-L stainless steel autoclave was charged with pure water (1000 g), NEOCOL P (sodium dioctyl sulfosuccinate, 1.62 g, 1620 ppm based on polywater), and vinyl acetate (23.2 g). The air in the autoclave was replaced with nitrogen gas. The autoclave was further charged with TFE (72 g), and then the temperature in the vessel was increased to 60° C. At this time, the pressure in the vessel was 0.80 MPa. To the vessel was added 10 g of a 4.8% by mass aqueous solution of APS with stirring so that the reaction was started.

The stirring speed at the time of starting the reaction was 400 rpm. The pressure during the polymerization was automatically adjusted in the range of 0.775 to 0.800 MPa with use of an electromagnetic valve in the same manner as in Example 1. During the reaction, TFE was continuously supplied through the electromagnetic valve, and a mixed solution of vinyl acetate and UDA (vinyl acetate: 218.4 g, UDA: 10.6 g) was continuously supplied by a liquid supplying pump.

After 11.8 hours from the start of the reaction, the supply of TFE and the mixed solution was stopped to end the reaction. Thereafter, the temperature and pressure in the vessel were brought back to the normal temperature and pressure to terminate the polymerization, whereby 1742.8 g (solids concentration: 34.1% by mass) of a TFE/vinyl acetate/UDA copolymer emulsion was obtained. Neither scale nor sedimentation was formed after production of the polymer emulsion.

Example 5

A 3-L stainless steel autoclave was charged with pure water (1000 g), sodium carbonate (0.1375 g), NEOCOL P (sodium dioctyl sulfosuccinate, 1.62 g, 1620 ppm based on polywater), and vinyl acetate (23.2 g). The air in the autoclave was replaced with nitrogen gas. The autoclave was further charged with TFE (71 g), and then the temperature in the vessel was increased to 60° C. At this time, the pressure in the vessel was 0.80 MPa. To the vessel was added 10 g of a 4.8% by mass aqueous solution of APS with stirring so that the reaction was started.

The stirring speed at the time of starting the reaction was 400 rpm. The pressure during the polymerization was automatically adjusted in the range of 0.775 to 0.800 MPa with use of an electromagnetic valve in the same manner as in Example 1. During the reaction, TFE was continuously supplied through the electromagnetic valve, and a mixed solution of vinyl acetate and 4-hydroxybutyl vinyl ether (HBVE) (vinyl acetate: 109.5 g, HBVE: 25.8 g) was continuously supplied by a liquid supplying pump.

After 5.75 hours from the start of the reaction, the temperature in the vessel was increased to 70° C. At each time point of 8.67 hours and 11.5 hours after the start of the reaction, 10 g of a 4.8% by mass aqueous solution of APS was added. After 13.7 hours from the start of the reaction, the supply of TFE and the mixed solution was stopped to end the reaction. Thereafter, the temperature and pressure in the vessel were brought back to the normal temperature and pressure to terminate the polymerization, whereby 1385 g (solids concentration: 25% by mass) of a TFE/vinyl acetate/HBVE copolymer emulsion was obtained. Neither scale nor sedimentation was formed after production of the polymer emulsion.

Example 6

A 3-L stainless steel autoclave was charged with pure water (1000 g), sodium carbonate (0.1375 g), NEOCOL P (sodium dioctyl sulfosuccinate, 1.62 g, 1620 ppm based on polywater), and vinyl acetate (23.2 g). The air in the autoclave was replaced with nitrogen gas. The autoclave was further charged with TFE (71 g), and then the temperature in the vessel was increased to 70° C. At this time, the pressure in the vessel was 0.80 MPa. To the vessel was added 10 g of a 4.8% by mass aqueous solution of APS with stirring so that the reaction was started.

The stirring speed at the time of starting the reaction was 400 rpm. The pressure during the polymerization was automatically adjusted in the range of 0.775 to 0.800 MPa with use of an electromagnetic valve in the same manner as in Example 1. During the reaction, TFE was continuously supplied through the electromagnetic valve, and a mixed solution of vinyl acetate, UDA, and HBVE (vinyl acetate: 236.6 g, UDA: 6.4 g, HBVE: 51.1 g) was continuously supplied by a liquid supplying pump.

At each time point of 2.4 hours, 6.9 hours, and 9.6 hours after the start of the reaction, 10 g of a 4.8% by mass aqueous solution of APS was added. After 12.6 hours from the start of the reaction, 10 g of a 2.4% by mass aqueous solution of APS was added. After 13.8 hours from the start of the reaction, the supply of TFE and the mixed solution was stopped to end the reaction. Thereafter, the temperature and pressure in the vessel were brought back to the normal temperature and pressure to terminate the polymerization, whereby 1658 g (solids concentration: 34.8% by mass) of a TFE/vinyl acetate/UDA/HBVE copolymer emulsion was obtained. Neither scale nor sedimentation was formed after production of the polymer emulsion.

Example 7

A 3-L stainless steel autoclave was charged with pure water (1000 g), vinyl acetate (23.2 g), and NEOCOL P (sodium dioctyl sulfosuccinate, 1.62 g, 1620 ppm based on polywater). The air in the autoclave was replaced with nitrogen gas. The autoclave was further charged with TFE (37 g), and then the temperature in the vessel was increased to 80° C. The autoclave was charged with TFE (30 g) again. At this time, the pressure in the vessel was 0.809 MPa. To the vessel was added 22 g of a 1% by mass aqueous solution of APS with stirring so that the reaction was started. At the start of the reaction, addition of vinyl acetate was started so that 283 g of vinyl acetate was added over 6 hours. During the reaction, TFE was continuously supplied through an electromagnetic valve. The stirring speed was 500 rpm.

The supply of TFE and the pressure were controlled using an electromagnetic valve which was set to operate in a cycle of automatically opening to supply TFE when TFE was consumed and the pressure in the vessel reached 0.800 MPa, and automatically closing when the pressure in the vessel reached 0.775 MPa.

After 6 hours from the start of the reaction, the supply of TFE and vinyl acetate was stopped to end the reaction. Thereafter, the reaction was allowed to proceed for 1 hour, and then the temperature and pressure in the vessel were brought back to the normal temperature and pressure to terminate the polymerization, whereby 1661 g (solids concentration: 38.5% by mass) of a TFE/vinyl acetate copolymer emulsion was obtained. Neither scale nor sedimentation was formed after production of the polymer emulsion.

Comparative Example 1

A 0.5-L stainless steel autoclave was charged with pure water (250 g), sodium carbonate (0.55 g), sodium dodecyl sulfate ($C_{12}H_{25}OSO_3Na$, 1.54 g, 6000 ppm based on polywater), CHVE (40.0 g), and UDA (2.5 g). The air in the autoclave was replaced with nitrogen gas. The autoclave was further charged with TFE (9 g), and then the temperature in the vessel was increased to 60° C. The pressure in the vessel was 0.875 MPa at this time. To the vessel was added 5.0 g of a 10% by mass aqueous solution of APS with stirring so that the reaction was started. During the reaction, TFE was continuously supplied through an electromagnetic valve. The stirring speed at the time of starting the reaction was 260 rpm. The pressure during the polymerization was automatically adjusted in the range of 0.875 to 0.850 MPa with use of the electromagnetic valve in the same manner as in Example 1.

The stirring speed was increased to 600 rpm after 1.0 hour from the start of the reaction. Since the time for one cycle was lengthened to 20 minutes, the supply of TFE was stopped to end the reaction after 5.0 hours from the start of the reaction. Thereafter, the temperature and pressure in the vessel were brought back to the normal temperature and pressure to terminate the polymerization, whereby 302.4 g (solids concentration: 17.6% by mass) of a TFE/CHVE/UDA copolymer emulsion was obtained. The polymerization rate was 23.6 g/h/L. The polymer emulsion contained a small amount of suspended matters, and caused formation of a small amount of scale on the reaction vessel.

Comparative Example 2

A 0.5-L stainless steel autoclave was charged with pure water (250 g), sodium carbonate (0.55 g), sodium cetyl sulfate ($C_{16}H_{33}OSO_3Na$, 1.54 g, 6000 ppm based on polywater), CHVE (40.0 g), and UDA (2.5 g). The air in the autoclave was replaced with nitrogen gas. The autoclave was further charged with TFE (9 g), and then the temperature in the vessel was increased to 60° C. At this time, the pressure in the vessel was 0.75 MPa. To the vessel was added 5.0 g of a 10% by mass aqueous solution of APS with stirring so that the reaction was started. During the reaction, TFE was continuously supplied through an electromagnetic valve. The stirring speed at the time of starting the reaction was 260 rpm. The pressure during the polymerization was automatically adjusted in the range of 0.750 to 0.725 MPa with use of the electromagnetic valve in the same manner as in Example 1.

The stirring speed was increased to 600 rpm after 1.0 hour from the start of the reaction. Since the time for one cycle was lengthened to 20 minutes, the supply of TFE was stopped to end the reaction after 5.6 hours from the start of the reaction. Thereafter, the temperature and pressure in the vessel were brought back to the normal temperature and pressure to terminate the polymerization, whereby 314.4 g (solids concentration: 16.6% by mass) of a TFE/CHVE/UDA copolymer emulsion was obtained. The polymerization rate was 16.7 g/h/L. The polymer emulsion contained a small amount of suspended matters, and caused formation of a small amount of scale on the reaction vessel.

Comparative Example 3

A 0.5-L stainless steel autoclave was charged with pure water (250 g), sodium carbonate (0.55 g), a 25% by mass aqueous solution of sodium lauryl sulfosuccinate represented by

[Chem. 7]

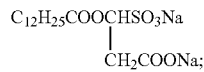

(6.17 g, 6000 ppm based on polywater), CHVE (40.0 g), and UDA (2.5 g). The air in the autoclave was replaced with nitrogen gas. The autoclave was further charged with TFE (9 g), and then the temperature in the vessel was increased to 60° C. At this time, the pressure in the vessel was 0.75 MPa. To the vessel was added 5.0 g of a 10% by mass aqueous solution of APS with stirring so that the reaction was started. During the reaction, TFE was continuously supplied through an electromagnetic valve. The stirring speed at the time of starting the reaction was 260 rpm. The pressure during the polymerization was automatically adjusted in the range of 0.750 to 0.725 MPa with use of the electromagnetic valve in the same manner as in Example 1.

The stirring speed was increased to 600 rpm after 1.0 hour from the start of the reaction. Since the time for one cycle was lengthened to 20 minutes, the supply of TFE was stopped to end the reaction after 5.6 hours from the start of the reaction. Thereafter, the temperature and pressure in the vessel were brought back to the normal temperature and pressure to terminate the polymerization, whereby 314.4 g (solids concentration: 16.6% by mass) of a TFE/CHVE/UDA copolymer emulsion was obtained. The polymerization rate was 8.5 g/h/L. The polymer emulsion contained a small amount of suspended matters, and caused formation of a small amount of scale on the reaction vessel.

The invention claimed is:
1. A method for producing a fluoropolymer, comprising aqueous dispersion polymerization in an aqueous dispersion polymerization medium of a fluoroolefin in the presence of a compound (1) represented by formula (1):

[Chem. 1]

(1)

wherein $R^1$ and $R^2$ are the same as or different from each other, and each represent a $C_4$ to $C_{12}$ non-fluorinated saturated hydrocarbon group; and M is an alkali metal, an ammonium salt, or an amine salt,
wherein the aqueous dispersion polymerization of the fluoroolefin is carried out together with a non-fluorinated vinyl monomer and a non-fluorinated monomer having a crosslinkable group,
wherein the non-fluorinated monomer having a crosslinkable group is an unsaturated carboxylic acid,
wherein the amount of the compound (1) is 500 to 50000 ppm based on the amount of water in the aqueous dispersion polymerization medium, and
wherein the non-fluorinated vinyl monomer is at least one selected from the group consisting of vinyl ethers and vinyl esters.

2. The method for producing a fluoropolymer according to claim 1,
wherein in the above formula (1), $R^1$ and $R^2$ are the same as each other, and represent a $C_4$ to $C_{12}$ non-fluorinated alkyl group.

3. The method for producing a fluoropolymer according to claim 1,
wherein the compound (1) is sodium dioctyl sulfosuccinate or sodium didecyl sulfosuccinate.

4. The method for producing a fluoropolymer according to claim 1,
wherein the fluoroolefin is at least one selected from the group consisting of vinyl fluoride, vinylidene fluoride, tetrafluoroethylene, hexafluoropropylene, chlorotrifluoroethylene, and 2,3,3,3-tetrafluoropropene.

5. The method for producing a fluoropolymer according to claim 1,
wherein the fluoroolefin is at least one selected from the group consisting of tetrafluoroethylene, hexafluoropropylene, chlorotrifluoroethylene, and 2,3,3,3-tetrafluoropropene.

6. The method for producing a fluoropolymer according to claim 1,
wherein the aqueous dispersion polymerization is emulsion polymerization.

* * * * *